US011505270B2

United States Patent
Lobban et al.

(10) Patent No.: US 11,505,270 B2
(45) Date of Patent: Nov. 22, 2022

(54) MOTORCYCLE FAIRING

(71) Applicants: Jason Lobban, Perris, CA (US); Steven Thomas, Redlands, CA (US)

(72) Inventors: Jason Lobban, Perris, CA (US); Steven Thomas, Redlands, CA (US)

( * ) Notice: Subject to any disclaimer, the term of this patent is extended or adjusted under 35 U.S.C. 154(b) by 478 days.

(21) Appl. No.: 16/532,317

(22) Filed: Aug. 5, 2019

(65) Prior Publication Data

US 2020/0039596 A1 Feb. 6, 2020

Related U.S. Application Data

(60) Provisional application No. 62/715,171, filed on Aug. 6, 2018.

(51) Int. Cl.
| | |
|---|---|
| *B62J 17/00* | (2020.01) |
| *B62J 45/10* | (2020.01) |
| *B62J 27/30* | (2020.01) |
| *B62J 50/21* | (2020.01) |

(52) U.S. Cl.
CPC ............. *B62J 17/00* (2013.01); *B62J 27/30* (2020.02); *B62J 45/10* (2020.02); *B62J 50/21* (2020.02)

(58) Field of Classification Search
CPC ............. B62J 17/00; B62J 17/06; B62J 45/10
USPC .......................................... 296/181.5, 180.1
See application file for complete search history.

(56) References Cited

U.S. PATENT DOCUMENTS

| | | | | |
|---|---|---|---|---|
| 4,136,890 A | * | 1/1979 | Vertucci | B62J 17/06 296/78.1 |
| 4,974,759 A | * | 12/1990 | McDonough | B62J 45/10 224/443 |
| 6,042,171 A | * | 3/2000 | Hesse | B62J 17/06 296/78.1 |
| 7,178,858 B1 | * | 2/2007 | Hesse | B62J 17/06 296/180.1 |
| 8,047,597 B2 | * | 11/2011 | Nakamura | B62J 17/06 296/78.1 |
| 9,216,789 B2 | * | 12/2015 | Hamlin | B62K 21/18 |
| 9,381,873 B2 | * | 7/2016 | Cotton | B60R 11/0217 |
| 10,683,051 B2 | * | 6/2020 | Tsou | F01P 5/06 |
| 2003/0160425 A1 | * | 8/2003 | Hyndman | B62J 17/06 280/304.3 |

(Continued)

OTHER PUBLICATIONS

Moto Onfire La-guna Fairing, Amazon.com, https://www.amazon.com/Rushmore-Fairings-Speaker-Touring-Electra/dp/B0751F74BM/ref=sr_1_1?keywords=moto%2Bonfire%2Bla-guna%2Borange%2Brushmore&qid=1638650891&sr=8-1&th=1, printed from the internet, Dec. 4, 2021.*

*Primary Examiner* — Jason S Morrow
(74) *Attorney, Agent, or Firm* — Knobbe, Martens, Olson & Bear LLP

(57) ABSTRACT

A motorcycle fairing includes a fairing body having a mounting surface for mounting an audio speaker. The fairing body defines an internal space for accommodating a portion of the speaker. The fairing includes an external wall portion. An internal wall is configured, along with the external wall portion, to seal the internal space. An upper portion defines an inboard portion and an outboard portion. An upper surface of the inboard portion is positioned below an upper surface of the outboard portion. An edge is defined by the upper surface of the outboard portion. The upper surface slopes downward on each side of the edge. The edge extends in an inboard-to-outboard direction in a forward-to-rearward direction. In some configurations, the inboard portion defines an airfoil shape.

10 Claims, 4 Drawing Sheets

(56) References Cited

U.S. PATENT DOCUMENTS

2009/0296956 A1* 12/2009 Gregory .................. B62J 45/10
                                                          381/86
2017/0361888 A1* 12/2017 Lawrence ................ B62J 17/06

* cited by examiner

MOTORCYCLE FAIRING

BACKGROUND

Field

The present disclosure generally relates to motorcycles. In particular, the present disclosure relates to a motorcycle fairing, which can define a speaker housing, can create downforce on the motorcycle or can direct airflow toward the rider.

Description of Related Art

Existing motorcycle fairings have one or more disadvantages. For example, fairings that are configured to support speakers are not sealed and sound quality suffers. Existing motorcycle fairings generally overlook aerodynamic performance and the presence of the fairings can cause a deterioration in handling of the motorcycle. In addition, existing motorcycle fairings often block wind from being directed toward the rider, which can allow heat generated by the motorcycle engine to build up around the rider.

SUMMARY

The systems, methods and devices described herein have innovative aspects, no single one of which is indispensable or solely responsible for their desirable attributes. Without limiting the scope of the claims, some of the advantageous features will now be summarized.

In some configurations, a motorcycle fairing includes a fairing body having a mounting surface for mounting an audio speaker. The fairing body defines an internal space for accommodating a portion of the speaker. The fairing includes an external wall portion. An internal wall is configured, along with the external wall portion, to seal the internal space.

In some configurations, the fairing body further comprises an upper edge that extends in an inboard-to-outboard direction in a forward-to-rearward direction.

In some configurations, a mounting groove is provided on a front surface of the fairing body.

In some configurations, a cap covers the mounting groove.

In some configurations, the fairing body comprises an inboard upper portion and an inboard lower portion that define an open space therebetween.

In some configurations, the inboard upper portion defines a truncated airfoil.

In some configurations, a motorcycle fairing includes a fairing body having an upper portion. The upper portion defines an inboard portion and an outboard portion. An upper surface of the inboard portion is positioned below an upper surface of the outboard portion. An edge is defined by the upper surface of the outboard portion. The upper surface slopes downward on each side of the edge. The edge extends in an inboard-to-outboard direction in a forward-to-rearward direction.

In some configurations, a mounting groove is provided on a front surface of the fairing body.

In some configurations, a cap covers the mounting groove.

In some configurations, the fairing body comprises an inboard upper portion and an inboard lower portion that define an open space therebetween.

In some configurations, the inboard upper portion defines a truncated airfoil.

In some configurations, a motorcycle fairing has a fairing body having an upper portion. The upper portion defines an inboard portion and an outboard portion. An upper surface of the inboard portion is positioned below an upper surface of the outboard portion. The inboard portion defines an airfoil shape.

In some configurations, the fairing body further comprises an upper edge that extends in an inboard-to-outboard direction in a forward-to-rearward direction.

In some configurations, a mounting groove is provided on a front surface of the fairing body.

In some configurations, a cap covers the mounting groove.

In some configurations, the fairing body comprises an inboard lower portion, wherein the inboard portion of the upper portion and the inboard lower portion define an open space therebetween.

In some configurations, the inboard upper portion defines a truncated airfoil.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

DETAILED DESCRIPTION

Figure 1:
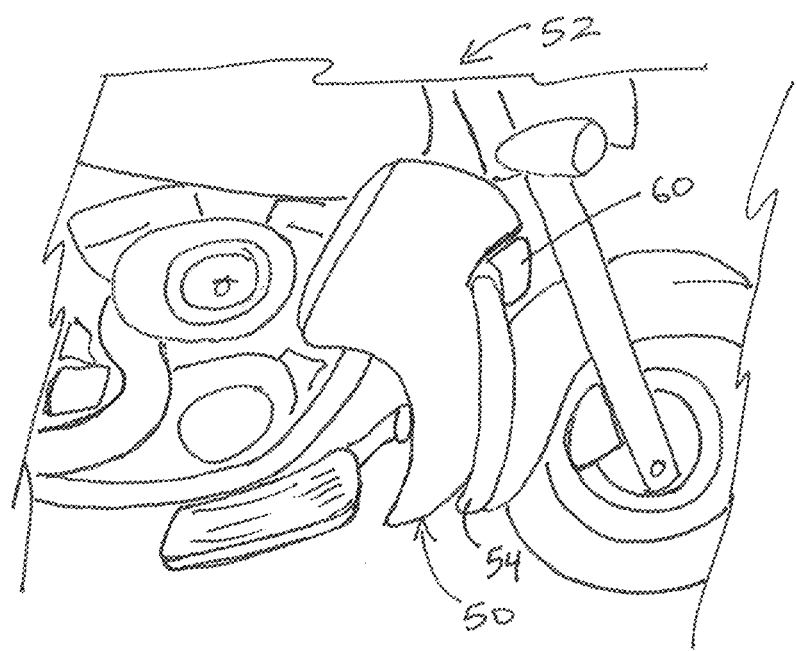
FIG. 1 is a partial side view of a motorcycle including a fairing having certain features, aspects and advantages of a preferred embodiment. The right side fairing is shown. The left side fairing can be a mirror image, or substantially a mirror image, of the right side fairing.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 2:
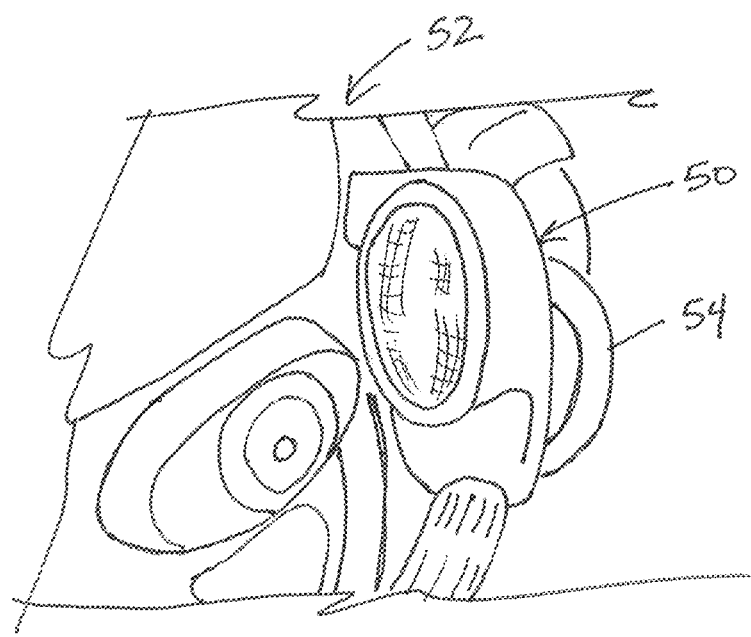
FIG. 2 is a partial perspective view of the motorcycle of FIG. 1 showing a rear side of the fairing.
Figure 3:
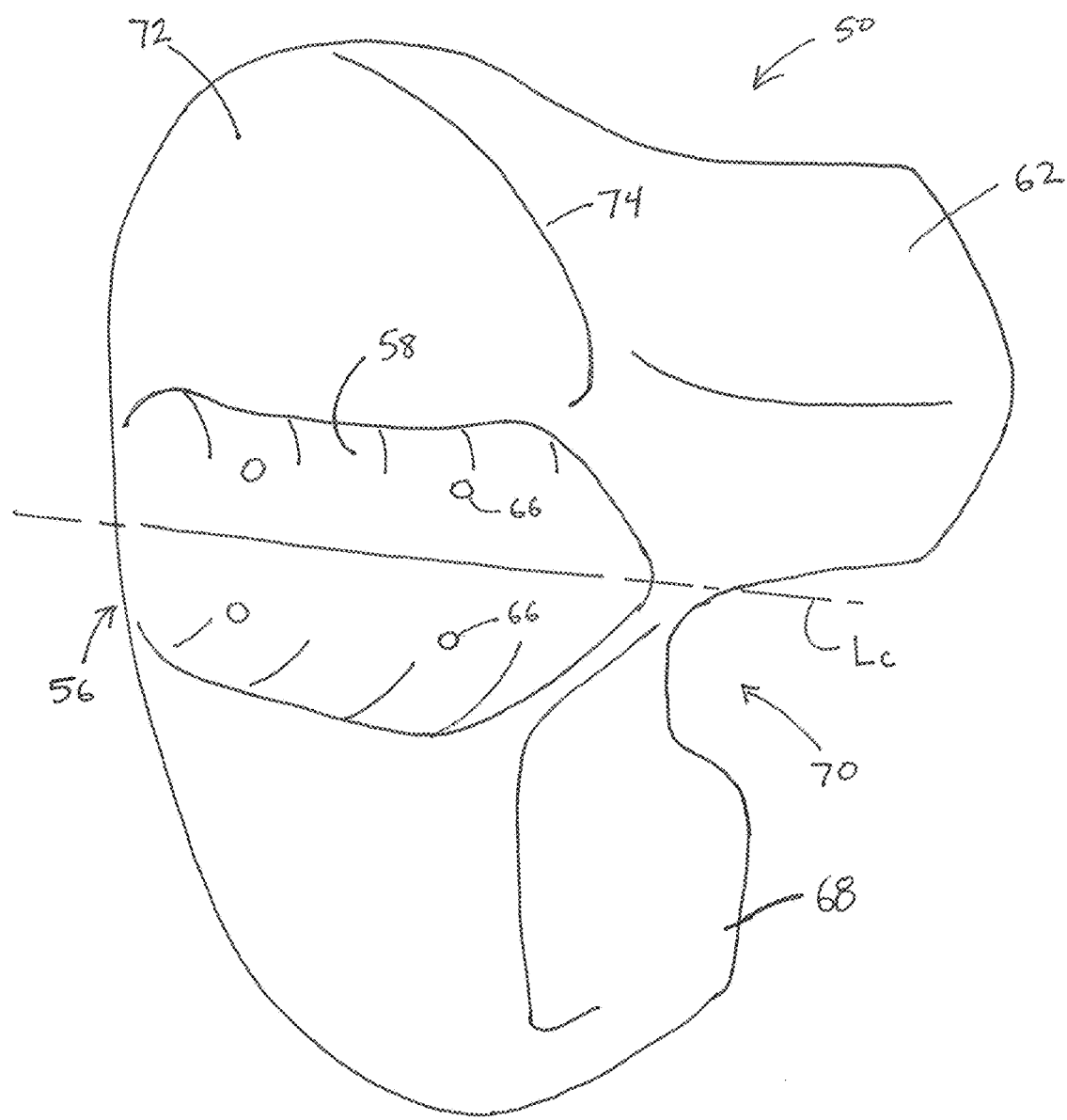
FIG. 3 is a front view of the fairing of FIGS. 1 and 2 separate from the motorcycle.
Figure 4:
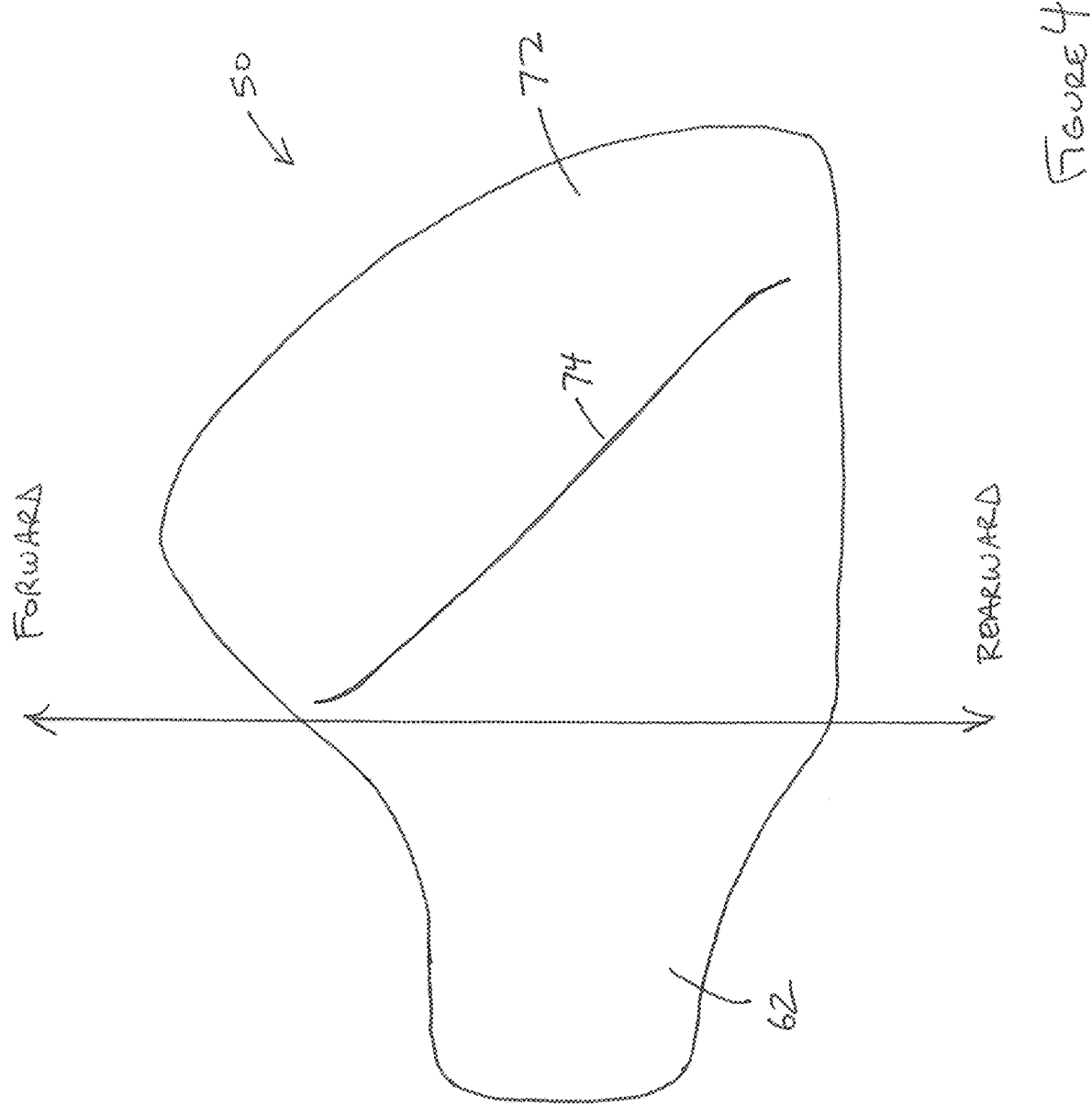
FIG. 4 is a top view of the fairing of FIG. 3.
Figure 5:
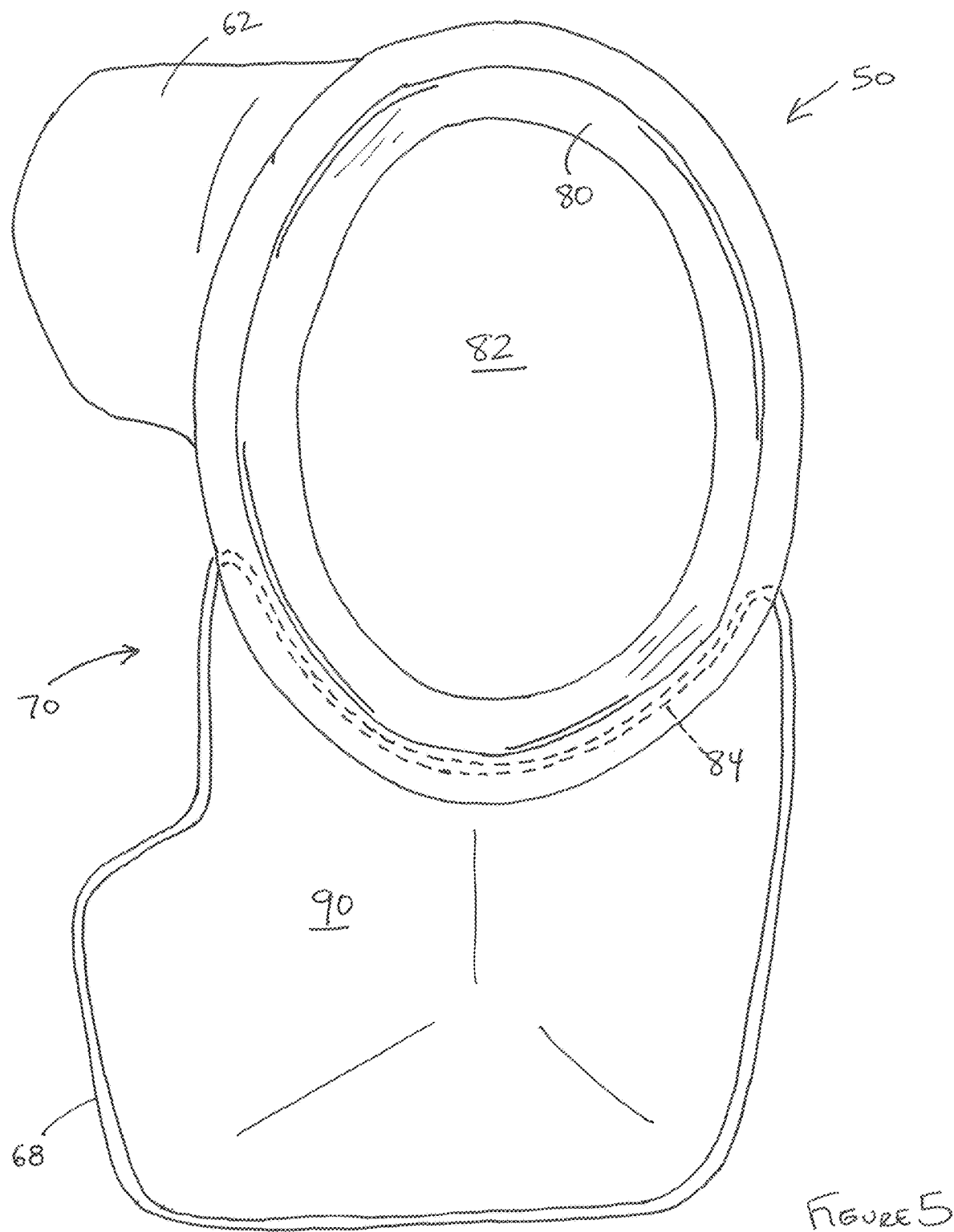
FIG. 5 is a rear view of the fairing of FIG. 3.

The figures illustrate a motorcycle fairing 50 having certain features, aspects and advantages of the present disclosure and that is configured to be attached to an associated motorcycle 52, as illustrated in FIGS. 1 and 2. In some configurations, a pair of motorcycle fairings 50 are attached to the motorcycle 52, with one fairing 50 on each of the left and right sides of the motorcycle 52. The two fairings 50 can be mirror images of one another or substantial mirror images of one another. Accordingly, only one fairing 50 (i.e., the right side fairing 50) is illustrated herein. The other fairing 50 (i.e., the left side fairing 50) can be assumed to be a substantial mirror image of the described fairing 50.

The fairing 50 can be configured to be attached to a lower, front portion of the associated motorcycle 52. In some configurations, the fairing 50 can be located forward of the front foot pegs/foot rests and, thus, the rider's feet. The fairing 50 can be configured to be positioned below an upper fairing/headlamp housing, which can support a windscreen. In some configurations, the fairing 50 is configured to mount to a crash bar 54 of the motorcycle 52; however, the fairing 50 can be configured for attachment to the motorcycle 52 by any suitable arrangement.

The illustrated fairing 50 is configured to fit one or more models of a Harley-Davidson motorcycle, such as one or more of a Street Glide, Road King, Road Glide and Ultra Classic models. In some configurations, the fairing 50 is configured to fit one or more, or any, model that includes or can accept an FLH crash bar. In some configurations, the upper headlamp/windscreen fairing of such motorcycle models is fixed, that is, it does not turn with turning of the handlebars or front wheel of the motorcycle. However, the fairing 50 can also fit other models and/or brands of motorcycles or can be modified to fit other models and/or brands of motorcycles.

In some configurations, the fairing 50 includes a mounting portion 56 configured for mounting of the fairing 50 to the associated motorcycle 52. In the illustrated arrangement, the mounting portion 56 comprises a generally horizontal groove 58 configured to receive the crash bar 54. The groove 58 defines a centerline $L_C$, which can coincide or substantially coincide with a centerline of the crash bar 54. In the illustrated arrangement, the groove 58 extends only a portion of a total width of the fairing 50. In particular, the groove 58 is defined by an outboard portion of the fairing and an inboard portion of the fairing 50 does not include the groove 58. In some configurations, a cap 60 (FIG. 1) covers a portion or an entirety of the crash bar 54 that is located within the groove 58. The cap 60 can define an outer surface that continuously blends into and completes the outer surface of the fairing 50. A portion of the crash bar 54 inboard of the cap 60 is exposed when viewed from the front of the motorcycle 52. The cap 60 can attach to the crash bar 54 and/or the main body of the fairing 50 by any suitable arrangement, such as mechanical fastener(s).

In some configurations, the fairing 50 is configured to enhance aerodynamics of the motorcycle 52 and/or airflow around the motorcycle 52. For example, the fairing 50 can be configured to provide downforce to the motorcycle 52 at least above a certain speed. In addition, or in the alternative, the fairing 50 can be configured to provide airflow to the rider's legs or dissipate engine heat from the space in which the rider's legs are located. For example, an upper portion of the fairing 50 can include an inboard portion 62 that defines an airfoil or partial airfoil shape. In particular, the inboard portion 62 defines a truncated airfoil shape, meaning that the leading edge of the inboard portion 62 defines an airfoil shape and the rearward edge does not. The rearward edge preferably is generally perpendicular to a chord length of the airfoil shape defined by the leading edge. The upper surface of the inboard portion 62 is upwardly sloped in a front-to-rear direction when the fairing 50 is assembled to the motorcycle 52 and the motorcycle 52 is standing upright on a flat surface. In the illustrated arrangement, the upper surface of the inboard portion 62 is relatively smooth in shape. The lower surface of the inboard portion 62 is downwardly sloped and changes (increases) in downward slope in the front-to-rear direction. The slope change can be configured to work with the presence of the exposed portion of the crash bar 54.

The inboard portion 62 can be configured to accommodate the headlamp/windscreen fairing of the motorcycle 52. The fairing 50 can also comprise a lower protrusion 68 and a space 70 between the protrusion 64 and the lower protrusion 68.

An outboard portion 72 of the fairing 50 has an upper portion that extends above the inboard portion 62. The outboard portion 72 also has a lower portion that is beside or slightly above the lower protrusion 68. The outboard portion 72 extends continuously from the upper portion to the lower portion.

The upper portion of the outboard portion 72 defines an edge or an inflection line 74 that extends in a forward-to-rearward direction along a top of the fairing 50. The edge 74 extends in an inboard-to-outboard direction in the forward-to-rearward direction. In some configurations, the edge 74 defines an angle with the forward-to-rearward direction of between about 30-60 degrees, such as about 45 degrees. The edge 74 defines a localized high point of the fairing 50 and the upper surface extends downwardly on each side of the edge 74. In the illustrated arrangement, the edge 74 is spaced inwardly from an outer edge of the fairing 50. In some configurations, the edge 74 can be curved along its length when viewed from any one or combination of above, the side or the front.

A width of the inboard portion 62 can be between about 3-7 inches, or about 3½ to 5½ inches. A height of the inboard portion 62 can be between about 3-6 inches, or about 4½ inches. A depth of the inboard portion 62 can be between about 2½-4 inches, or about 3 inches. The upper surface of the inboard portion 62 can be about 2½-4 inches, or about 3¼ inches from a centerline of the groove 58. The upper surface of the inboard portion 62 can be spaced below an uppermost point on the outboard portion 72 by at least about 1½ inches. At least one set of mounting holes 66 for securing the fairing 50 to the crash bar 54 can be spaced about 5-8 inches, or about 6⅞ inches, from an inner edge of the inboard portion 62.

As described above, the fairing 50 can be configured to support and house an audio speaker, such as a 6 inch by 9 inch speaker. The fairing 50 can comprise a mounting surface 80 configured for mounting a speaker. The mounting surface 80 as illustrated is generally oval in shape, but can be provided in any suitable shape to mount the desired speaker. As shown in FIGS. 1 and 2, the fairing 50 can also include a screen or cover that protects the speaker.

The fairing 50 defines an internal space 82 configured to accommodate the speaker. In some configurations, the internal space 82 is sealed or substantially sealed when the speaker is assembled to the fairing 50. For example, the fairing 50 can comprise an internal wall 84 that, along with the external walls (e.g., forward, rearward, upper, inner and outer wall portions), creates the sealed internal space 82. The internal wall 84 preferably extends the entire width and depth, or substantially the entire width and depth, of the internal space 82.

Below the internal wall 84 is an open space 90 configured to accommodate a foot of the rider of the motorcycle 52. The open space 90 can also accommodate portions of the motorcycle 52, such as a foot rest, shifter, brake pedal, etc. The open space 90 can have a maximum height of about 6-12 inches, or about 9 inches. The open space 90 can have a depth of about 6-10 inches, or about 8 inches, in the forward-to-rearward direction. Thus, the open space 90 can be partially or wholly defined by side walls, a bottom wall of the lower portion of the fairing 50 and the internal wall 84. The open space 90 can have a maximum width of about 8-12 inches, or about 10 inches.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A motorcycle fairing, comprising:
 a fairing body having a mounting surface for mounting an audio speaker, the fairing body defining an internal space for accommodating a portion of the speaker;
 an external wall portion;
 an internal wall configured, along with the external wall portion, to seal the internal space; and
 a mounting groove formed by an indent in a vertical portion of a front surface of the external wall portion of the fairing body, wherein the mounting groove defines a centerline configured to coincide with a centerline of a motorcycle crash bar received within the mounting groove such that a portion of the external wall portion defining the mounting groove extends both above and below the motorcycle crash bar.

2. The motorcycle fairing of claim 1, wherein the fairing body further comprises an upper edge that extends in an inboard-to-outboard direction in a forward-to-rearward direction.

3. The motorcycle fairing of claim 1, further comprising a cap that covers the mounting groove, wherein the cap comprises an outer surface that continuously blends into and completes the front surface of the fairing both above and below the mounting groove.

4. The motorcycle fairing of claim 1, wherein the fairing body comprises an inboard portion and an outboard portion, wherein the inboard portion is relatively closer to a centerline of a motorcycle to which the fairing is mounted in use than the outboard portion, wherein the inboard portion comprises an inboard upper protrusion and a separate inboard lower protrusion each having an inboard terminal end and that define an open space therebetween, wherein the open space opens to an inboard side of the fairing.

5. The motorcycle fairing of claim 4, wherein the inboard upper portion defines a truncated airfoil.

6. A motorcycle fairing, comprising:
a fairing body having an inboard portion and an outboard portion, wherein the inboard portion is located closer to a centerline of a motorcycle to which the fairing is mounted in use than the outboard portion, wherein the fairing body comprises an upper portion that defines an inboard upper portion and an outboard upper portion, wherein an upper surface of the inboard upper portion is positioned below an upper surface of the outboard upper portion;
a mounting groove on a front surface of the fairing body configured to receive a motorcycle crash bar received within the mounting groove, the mounting groove having a centerline, wherein the upper portion is located above the centerline of the mounting groove;
wherein a lower surface and the upper surface of the inboard upper portion cooperate to define an airfoil shape.

7. The motorcycle fairing of claim 6, wherein the fairing body further comprises an upper edge that extends in an inboard-to-outboard direction in a forward-to-rearward direction and defines an angle of between 30 degrees to 60 degrees with respect to the forward-to-rearward direction.

8. The motorcycle fairing of claim 6, further comprising a cap that covers the mounting groove.

9. The motorcycle fairing of claim 6, wherein the fairing body comprises an inboard lower portion, wherein the inboard upper portion and the inboard lower portion each comprise a respective terminal end that are separate from one another and define an open space therebetween, wherein the open space opens to an inboard side of the fairing.

10. The motorcycle fairing of claim 6, wherein the inboard upper portion defines a truncated airfoil.

* * * * *